(12) United States Patent
Yae

(10) Patent No.: US 10,565,991 B2
(45) Date of Patent: Feb. 18, 2020

(54) VEHICULAR VOICE RECOGNITION SYSTEM AND METHOD FOR CONTROLLING THE SAME

(71) Applicants: Hyundai Motor Company, Seoul (KR); Kia Motors Corporation, Seoul (KR)

(72) Inventor: Seong Soo Yae, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 28 days.

(21) Appl. No.: 15/830,804

(22) Filed: Dec. 4, 2017

(65) Prior Publication Data
US 2019/0115015 A1 Apr. 18, 2019

(30) Foreign Application Priority Data
Oct. 12, 2017 (KR) .......................... 10-2017-0132159

(51) Int. Cl.
| G10L 15/22 | (2006.01) |
| G10L 15/18 | (2013.01) |
| G06F 16/9032 | (2019.01) |
| G06F 3/16 | (2006.01) |
| G10L 15/08 | (2006.01) |

(52) U.S. Cl.
CPC .............. *G10L 15/22* (2013.01); *G06F 3/167* (2013.01); *G06F 16/90332* (2019.01); *G10L 15/1815* (2013.01); *G10L 2015/086* (2013.01); *G10L 2015/223* (2013.01); *G10L 2015/228* (2013.01)

(58) Field of Classification Search
USPC .......................... 704/246, 247, 251, 252, 257
See application file for complete search history.

(56) References Cited

U.S. PATENT DOCUMENTS

| 2008/0228496 A1* | 9/2008 | Yu ........................... G06F 3/038 |
| | | 704/275 |
| 2016/0358604 A1* | 12/2016 | Dreuw .................... G10L 15/22 |
| 2017/0201609 A1* | 7/2017 | Salmenkaita ..... H04M 1/72561 |
| 2018/0182382 A1* | 6/2018 | Lee ..................... G06F 17/2785 |
| 2018/0233138 A1* | 8/2018 | Talwar .................... G10L 15/22 |

* cited by examiner

Primary Examiner — Leonard Saint Cyr
(74) Attorney, Agent, or Firm — Mintz Levin Cohn Ferris Glovsky and Popeo, P.C.; Peter F. Corless

(57) ABSTRACT

A vehicular voice recognition system for inferring an intention of a user includes: a storage storing an instruction use history, service use pattern information, and a service preferring item; a controller receiving an input instruction of the user and performing at least one of: a first inference operation of determining a service domain among a plurality of service domains corresponding to the input instruction and providing a service in the determined service domain, a second inference operation of providing a service based on the stored instruction use history, a third inference operation of providing a service based on the stored service use pattern information, and a fourth inference operation of providing a service based on the stored service preferring item; and an output unit provided in a vehicle outputting contents of the provided service using at least one of audio and images.

21 Claims, 8 Drawing Sheets

VEHICULAR VOICE RECOGNITION SYSTEM AND METHOD FOR CONTROLLING THE SAME

CROSS-REFERENCE TO RELATED APPLICATION

This application claims the benefit of priority to Korean Patent Application No. 10-2017-0132159, filed on Oct. 12, 2017 in the Korean Intellectual Property Office, the disclosure of which is incorporated herein in its entirety by reference.

TECHNICAL FIELD

The present disclosure relates generally to a voice recognition system for a vehicle, and more particularly, to a vehicular voice recognition system for inferring an intention of a user and a method for controlling the same.

BACKGROUND

Humans use language as a basic means of communication. Nowadays, language is similarly used when humans communicate with devices. As such, machine recognition of natural language is an important topic, such as a speech recognition system of a vehicle.

It is very difficult to fully understand and respond to all natural languages that people use. For this reason, natural languages have been translated into meaningful languages only within a group (hereinafter referred to as "domain") created by experts by organizing necessary meanings and corresponding expressions in a usage environment.

For example, in a case where a command that a user speaks is recognized and the recognized command is stored in the domain built in advance, a system may respond in an appropriate manner to the command of the user. However, if a keyword or a sentence is spoken but not defined in the domain, the command is not analyzed correctly. Because the system cannot find a service domain corresponding to the entered command, the system might perform a knowledge search (i.e., web-based search) to decipher the user's intent.

Problematically, if a web-based search is performed when the user's intent is not grasped, the system may provide contents that do not meet the user's intent or may interrupt a voice service due to error. In this case, the user determines that the system fails, and the user is not satisfied with the system. As such, the system may only provide the voice service to the user when the defined form and structure of the spoken sentence is completed. If the user does not know how to use or fails to speak the finished sentence, the voice service fails.

SUMMARY

The present disclosure is conceived to solve the above-described problems of the related art. The present disclosure provides a vehicular voice recognition system for inferring an intention of a user, which may recognize an intention of a user even when external noise is introduced in a process of making a speech by the user or when a predetermined instruction cannot be recognized (e.g., a spoken sentence is unfinished), and a method for controlling the same.

The technical objects of the present disclosure are not limited to the above-mentioned one, and the other unmentioned technical objects will become apparent to those skilled in the art from the following description.

In accordance with embodiments of the present disclosure, a vehicular voice recognition system for inferring an intention of a user includes: a storage storing an instruction use history, service use pattern information, and a service preferring item; a controller receiving an input instruction of the user and performing at least one of: a first inference operation of determining a service domain among a plurality of service domains corresponding to the input instruction and providing a service in the determined service domain, a second inference operation of providing a service based on the stored instruction use history, a third inference operation of providing a service based on the stored service use pattern information, and a fourth inference operation of providing a service based on the stored service preferring item; and an output unit provided in a vehicle outputting contents of the provided service using at least one of audio and images.

The controller may change the input instruction to text and performs the first to fourth inference operations based on the changed input instruction.

The controller may perform the first inference operation based on whether the input instruction coincides with a keyword in the service domain and a current state of the vehicle.

The controller may determine whether the instruction use history is defined in a service domain among the plurality of service domains, and when the use history is not defined in a service domain, the controller may perform the second inference operation of providing the service by selecting any one of the plurality of service domains based on a current state of the vehicle.

The controller may perform the third or fourth inference operations when an intention of the input instruction cannot be inferred through the first inference operation and the second inference operation.

The controller may determine whether pattern information among the service use pattern information is similar to a current state of the vehicle, and when similar pattern information is present, the controller may perform the third inference operation of providing the service based on the similar pattern information.

The service use pattern information may be generated through one or more services repeatedly used in the vehicle for a first period of time or more.

The controller may determine whether the service preferring item can be generated through one or more services repeatedly used for not less than a second period of time that is longer than the first period of time.

When the service preferring item cannot be generated, the controller may perform the fourth inference operation of providing a random service based on a current state of the vehicle.

Furthermore, in accordance with embodiments of the present disclosure, a method for controlling a vehicular voice recognition system for inferring an intention of a user includes: receiving an input instruction of the user; determining a service domain among a plurality of service domains corresponding to the input instruction; when the service domain is not determined, determining an instruction use history of the input instruction; when the instruction use history of the input instruction is not determined, determining service use pattern information; when the service use pattern information is not determined, determining a service preferring item; and outputting contents of a suggested service in a vehicle using at least one of audio and images.

The determining of the service domain corresponding to the input instruction may be performed based on whether the input instruction coincides with a keyword in the service domain and a current state of the vehicle.

The method may further include, when the service domain is determined, providing a service defined in the determined domain.

The determining of the instruction use history of the input instruction may include determining whether the instruction use history of the input instruction is present; when the instruction use history is present, determining whether the instruction use history is defined in a service domain among the plurality of service domains; and when the instruction use history is not defined in the service domain, selecting any one of the plurality of service domains based on a current state of the vehicle.

The method may further include when the instruction use history of the input instruction is determined, providing a service defined in a service domain defining the instruction use history or any one service domain selected from the plurality of domains.

The determining of the service use pattern information may include determining whether pattern information among the service use pattern information that is similar to a current state of the vehicle is present.

The determining of the service use pattern information may be performed based on the service use pattern information generated through one or more services repeatedly used in the vehicle for a first period of time or more.

The method may further include after the determining of the service use pattern information, and when the similar pattern information is present, providing a service based on the similar pattern information.

The determining of the service preferring item may include determining whether the service preferring item is to be generated through one or more services repeatedly used for not less than a second period of time that is longer than the first period of time.

The method may further include when the service preferring item cannot be generated, suggesting a random service based on the current state of the vehicle.

The method may further include when the service preferring item cannot be generated, providing a service based on the service preferring item.

Furthermore, in accordance with embodiments of the present disclosure, a method for controlling a vehicular voice recognition system for inferring an intention of a user includes: receiving an input instruction of the user; determining whether the input instruction is present in an instruction database; when the input instruction is not present in the instruction database, performing integrated inference based on at least one of: an instruction use history of the input instruction, service use pattern information, and a service preferring item; identifying whether a result of the integrated inference is present; and providing a service defined in the service domain corresponding to the result of the integrated inference.

The performing of the integrated inference may include selecting any one of a first inference result inferred through an operation of investigating an instruction use history of the recognized instruction, a second inference result inferred through an operation of determining service use pattern information based on the instruction use history, and a third inference result inferred through an operation of determining the service preferring item.

The performing of the integrated inference may include when any two results of the first to third inference results overlap each other, selecting the overlapping results as an inference result.

BRIEF DESCRIPTION OF THE DRAWINGS

The above and other objects, features and advantages of the present disclosure will be more apparent from the following detailed description taken in conjunction with the accompanying drawings.

Figure 1:
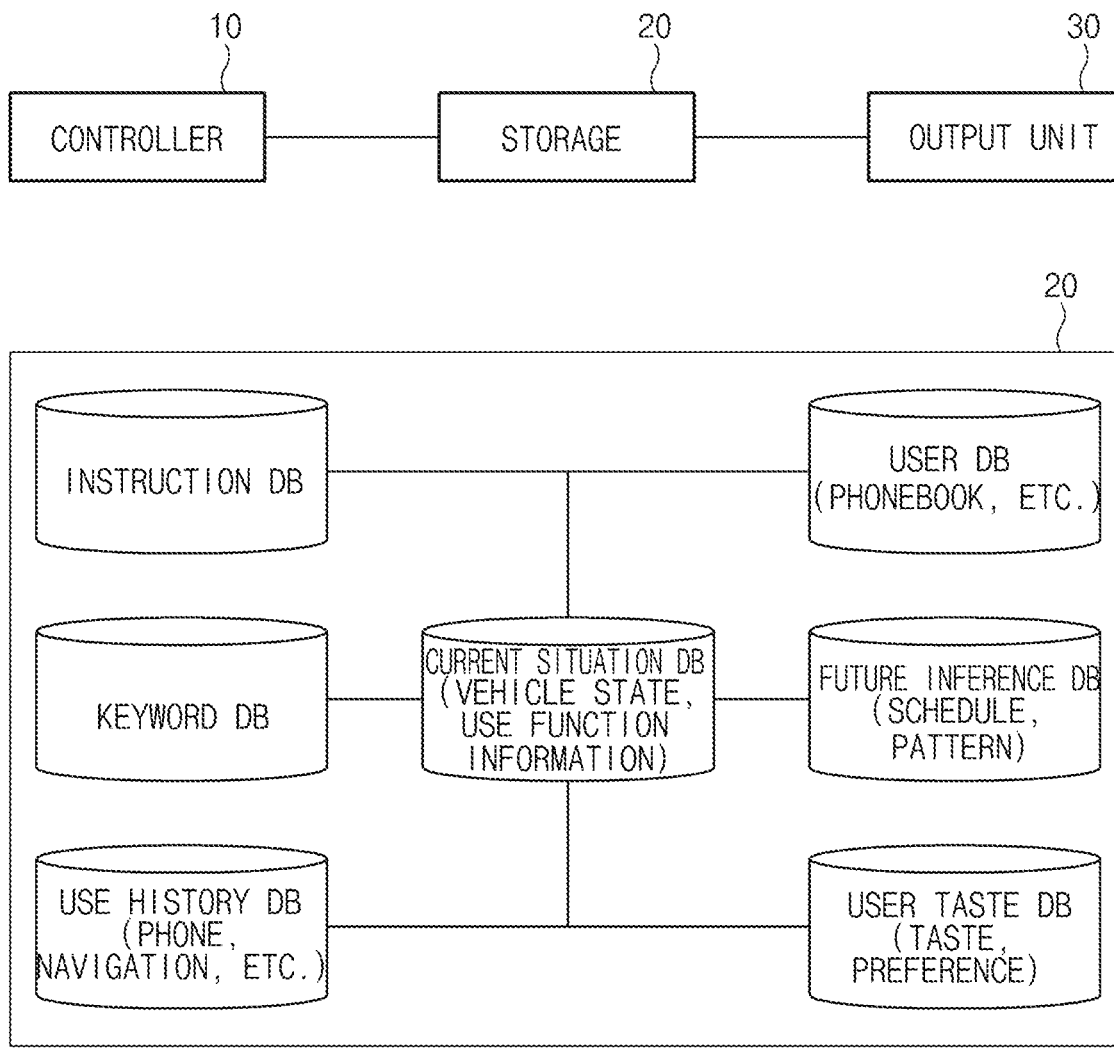
FIG. 1 is a diagram illustrating a vehicular voice recognition system according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. The terms are provided only to distinguish the elements from other elements, and the essences, sequences, orders, and numbers of the elements are not limited by the terms. In addition, unless defined otherwise, all terms used herein, including technical or scientific terms, have the same meanings as those generally understood by those skilled in the art to which the present disclosure pertains. The terms defined in the generally used dictionaries should be construed as having the meanings that coincide with the meanings of the contexts of the related technologies, and should not be construed as ideal or excessively formal meanings unless clearly defined in the specification of the present disclosure.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Referring now to the presently disclosed embodiments, FIG. 1 is a diagram illustrating a vehicular voice recognition system according to embodiments of the present disclosure.

As illustrated in FIG. 1, the vehicular voice recognition system according to the present disclosure may include a controller 10, a storage 20, and an output unit 30.

The present disclosure provides a specific service by inferring an intention of a user even when an instruction including a keyword that has to be essentially included to allow a system to perform an operation is not input. To achieve this, the controller 10 may perform four operations.

When an instruction uttered by the user is input to the controller 10, the controller 10 may convert the instruction to a text to recognize the instruction. The controller 10 identifies whether the instruction uttered by the user pertains to a perfect instruction defined in the system. The perfect instruction may refer to an instruction including a keyword that has to be essentially included to allow the system to perform an operation. When it is determined that the input instruction pertains to a perfect instruction, a service according to a command may be suggested while an inference operation is not performed.

First Inference Operation:

When the input instruction does not pertain to a perfect instruction, the controller 10 extracts some instructions of the input instruction and determines whether the extracted instructions are present in an instruction database. The description of the storage 20 will be referenced for the instruction database.

If the extracted instruction is present in the instruction database, the corresponding service is suggested, and if the extracted instruction is not present in the database, a service domain is determined. The service domain may be determined with reference to a keyword database and a user database. The service domain may be a group made by summarizing meanings that are necessary in a user environment and expressions corresponding thereto.

The controller 10 determines a service domain corresponding to the extracted instruction. Further, it is determined whether the extracted instruction coincides with a keyword in the service domain. When the extracted instruction is a word defined in the service domain, a service in the corresponding domain may be suggested.

Second Inference Operation

When the extracted instruction does not coincide with a keyword in the service, the controller 10 identifies a use history of the input instruction (alternatively referred to herein as "instruction use history") based on the user history. When a use history is present, a corresponding service domain may be identified based on information in the user history database. The database may be reference for the investigation of the use history.

When one service domain corresponds to the use history, a service in the corresponding domain may be suggested. When two service domains correspond to the use history, a service that is not set in the current state of the vehicle may be suggested based on the current state of the vehicle and the use information.

Third Inference Operation

The third inference operation may be performed when a use history of the extracted instruction is not present, that is, when the extracted instruction has never been input to the vehicle or an instruction, such as a natural language, which may be hardly understood by the system. Accordingly, the third inference operation may be performed when a service cannot be suggested based on the input instruction.

The third inference operation may include suggesting a service that is not set in the current state of the vehicle from the service use pattern information. A future inference database is referenced for the third inference operation. The service use pattern information may be generated through combination of one or more services repeatedly used for not less than a first period of time. For example, the vehicle is used to commute, and when the same service information is repeatedly provided for 3 months while commuting, the service use pattern information may be generated by combining the information. When the service use pattern information is not generated, the third inference operation cannot be performed.

Fourth Inference Operation

When a user history of the extracted instruction is not present, the fourth inference operation may be performed by analyzing a service preferring item. That is, when the extracted instruction has never been input to the vehicle or an instruction, such as a natural language, which can be hardly understood by the system is input, the fourth inference operation may be performed. Accordingly, the fourth inference operation may be performed when a service cannot be suggested based on the input instruction.

To achieve this, the controller 10 analyzes a service preferring item. A service preferring item database is referenced for the service preferring item. The service preferring item may be generated through combination of one or more services repeatedly used for not less than a second period of time, and the user may set a priority to the service preferring item. Here, the second period of time may refer to a period of time that is longer than the above-mentioned first period of time.

The controller 10 may recognize a tendency of the user when the service preferring item is defined. When the tendency of the user is recognized, a service that is not set in the current state of the vehicle may be suggested from the service preferring item. When the service preferring item is not defined, it is determined that the tendency of the user cannot be recognized, and a random service may be suggested based only on the current state of the vehicle.

When the user selects a suggested service by performing at least one of the first to fourth inference operations, the controller 10 may execute the selected service. All the histories used in the process of executing the suggested service may be stored in the service use history database included in the storage 20. Further, when the suggested service is executed, the initially input instruction may be stored as a new instruction in the instruction database. When the user does not select the suggested service, the controller 10 may induce a re-speech, and may maintain a conversation session without terminating the service.

The storage 20 may include an instruction database, a keyword database, a user database, a current situation database, a use history database, a future inference database, and a user taste database. The databases of the storage 20 may be mutually referenced during an inference operation of the controller.

A perfect instruction defined in advance in the system may be stored in the instruction database. If the service suggested by the system is accommodated, the input instruction may be stored in the instruction database as a new instruction.

Keywords represented for service domains may be stored in the keyword database. The keyword database may be referenced when a service domain corresponding to the input instruction is determined.

Information shared by the individual device of the user when the individual device of the user is registered in the vehicle, that is, data including a phonebook (i.e., address) of the mobile phone or mobile phone music may be stored in the user database.

A current state of the vehicle may be stored in the current state database, and in more detail, all information used in the vehicle, such as a location, a speed, and a destination of the vehicle, a listening audio may be stored.

All histories used in the vehicle by the user may be stored in the instruction use history database, and the used history may be stored for respective times.

Servicer use pattern information generated through combination of one or more services repeatedly used for not less than a first period of time may be stored in the future inference database, and a schedule of the user may be stored.

Service preferring items generated through combination of one or more services repeatedly used for not less than a second period of time may be stored in the service preferring item database. The service preferring items may include a preferred brand, a preferred singer, and a preferred interior temperature.

The output unit 30 may output a service suggested through the first to fourth inference operations performed by the controller 10 in an image or a voice.

Figure 2:
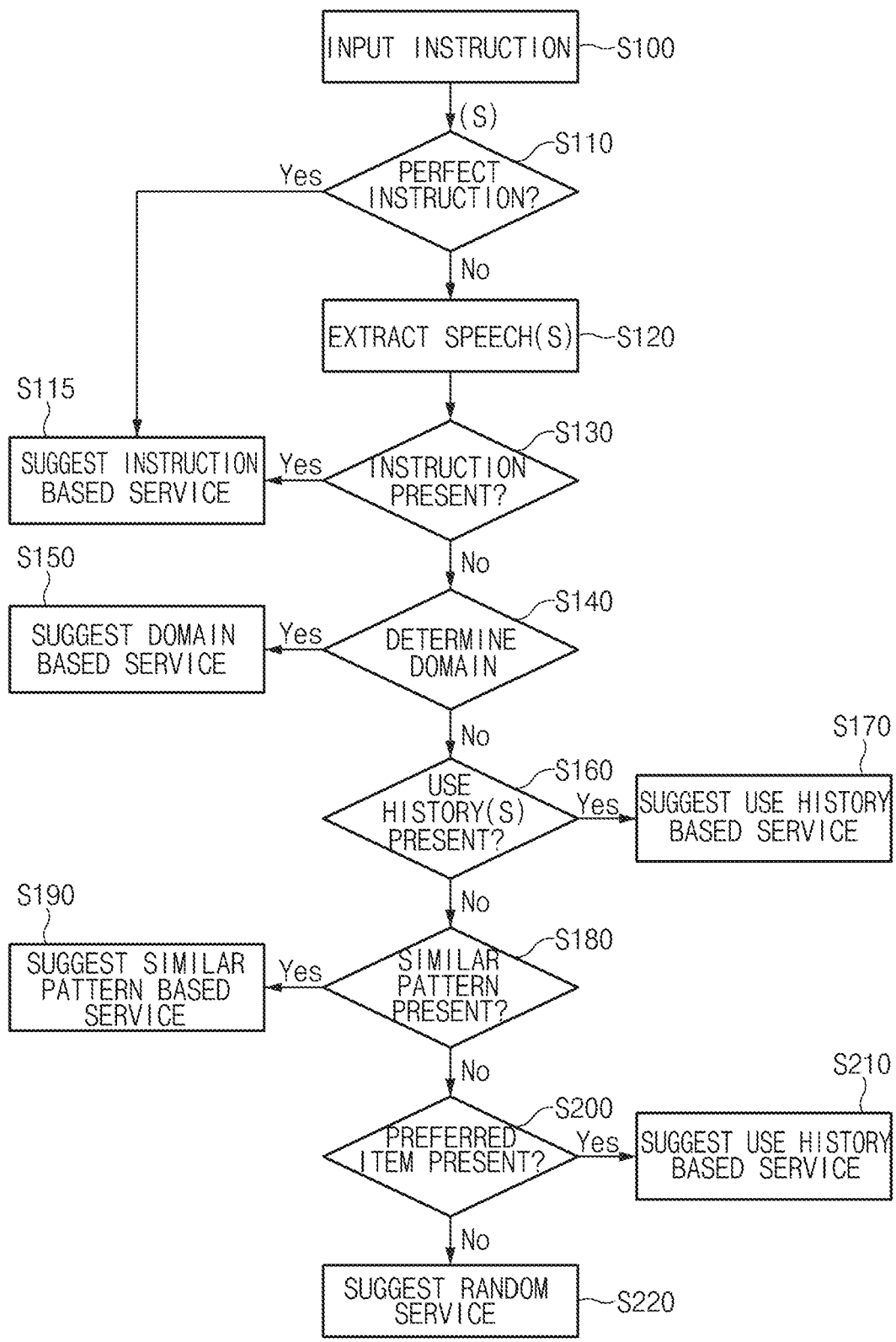
FIG. 2 is a flowchart illustrating all operations of a method for controlling a vehicular voice recognition system according to embodiments of the present disclosure.

FIG. 2 is a flowchart illustrating all operations of a method for controlling a vehicular voice recognition system according to embodiments of the present disclosure.

If an instruction is input (S100), the vehicular voice recognition system of the present disclosure determines whether the instruction is a perfect instruction (S110). If the input instruction pertains to a perfect instruction (Yes), an instruction based service is suggested (S115).

When a perfect instruction is not included in the recognized contents, the user extracts some instructions of the contents uttered by the user. Further, it is identified whether the extracted instruction is present in the instruction database included in the storage 20 (S130). If the extracted instruction is present in the instruction database (Yes), an instruction based service is suggested (S115).

When the extracted instruction is not present in the instruction database, a service domain is determined S(140). When it is determined that the extracted instruction is present in the service domain (Yes), a domain based service is suggested (S150). The operations of S140 and S150 will be described in more detail with reference to FIG. 3.

When it is determined that the extracted instruction is not present in the service domain (No), it is determined whether a use history of the input instruction is present (S160). When a user history of the input instruction is present, a service is suggested based on the user history (S170). The operations of S150 and S160 will be described in more detail with reference to FIG. 4.

When a use history of the input instruction is not present, it is determined whether a similar pattern is present (S180). When a similar pattern is present, a service is suggested based on the similar pattern (S190). The operations of S180 and S190 will be described in more detail with reference to FIG. 5.

When a similar pattern is not present, it is determined whether a service preferring item may be generated (S200). When a service preferring item may be generated (Yes), a service is suggested based on a preference item (S210). When the service preferring item cannot be generated (No), a random service is suggested. The operations of S200 to S220 will be described in more detail with reference to FIG. 6.

FIGS. 3 to 6 are flowcharts illustrating detailed operations of a method for controlling a system of the present disclosure.

Figure 3:
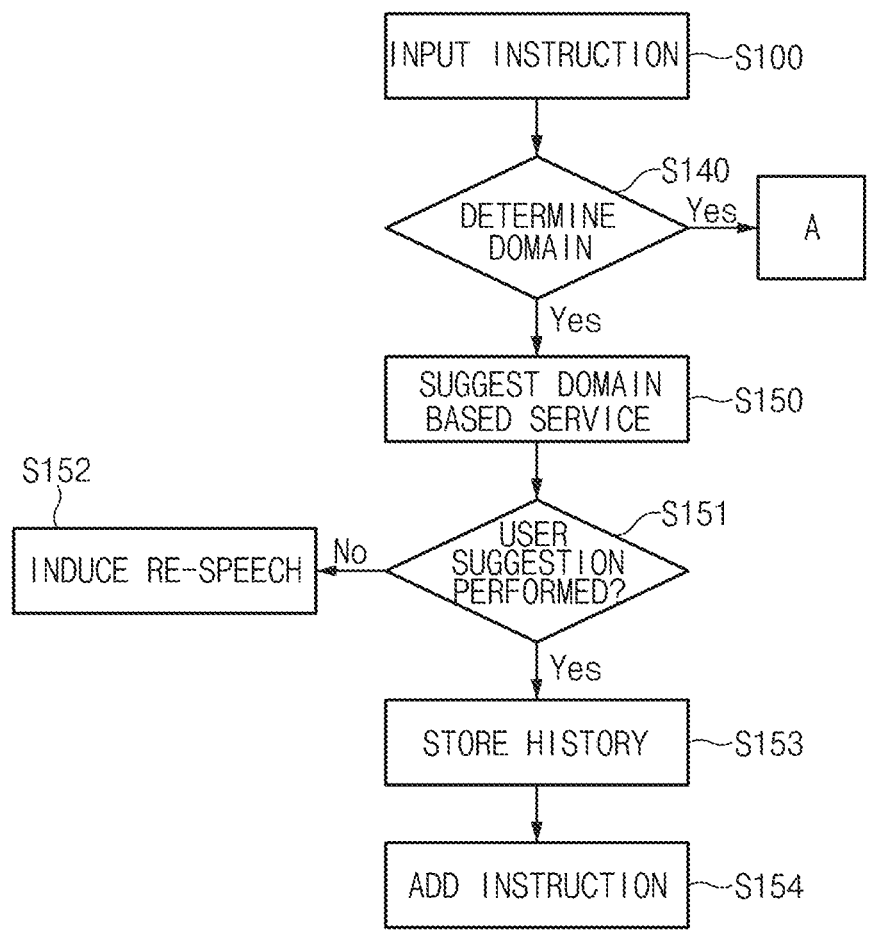
FIGS. 3 to 6 are flowcharts illustrating detailed operations of a method for controlling a system of the present disclosure.

As illustrated in FIG. 3, an instruction is input (S100). Operation S100 may include an operation of converting an instruction uttered by the user to a text. According to embodiments of the present disclosure, if an instruction of "Play" is input in operation S100, the instruction may be converted to a text to be recognized.

A service domain including the input instruction is determined (S140). According to embodiments of the present disclosure, in operation S140, a keyword database, a user database, and a current situation database may be referenced.

Table 1 represents keyword database information. Table 2 represents a user database. Table 3 represents current situation database information.

TABLE 1

| domain | | keyword | Note |
|---|---|---|---|
| Music | Control | Play, Shuffle, Listen, I want to hear, Stop | |
| | Property | Singer, Genre, Music, and Title | |
| Navigation | Control | Set destination, find, guide, gas station, POI name | |
| | Property | Major POI names (Starbucks, E-Mart, and Department store) | |
| Telephone | Control | Dialing, make a call, dial, hang up, send a text, and phonebook search | |
| | Property | Read a text, set filters | |

TABLE 2

| Operation | History of use | Note |
|---|---|---|
| Phone book | 1. Hong Gil Dong 2. Kim Young Hee 3. Kim Cheol Soo | Phone book |
| Music | Singer: Naal Title: already one year Album: Brown Eyes | Phone Music |
| | Singer: Hayes Title: Rain is coming Album: — | |

TABLE 3

| Inclination (preferred) item | Current situation |
| --- | --- |
| Current time | 8:30 pm |
| In-car temperature (Internal air) | 22 degrees |
| Setting and driving destination | Not set |
| Radio on while driving | Radio on |
| Gas warning light | off |
| IPod | Activation |
| USB | Inactivation |

In operation S140, referring to Table 1, because the input instruction of 'Play' is a word defined in a 'music' domain, it is determined through the keyword that the instruction of 'Play' is included in the music domain.

If it is determined that the instruction input in operation S140 is a word defined in the service domain (Yes), a service domain based service is suggested (S150). When the instruction extracted in operation S140 is not defined in the domain (No), operation A is performed.

Operation S150 may be performed based on the current state of the vehicle. According to embodiments of the present disclosure, because the instruction of 'Play' was recognized in a situation in which a radio is currently turned on, it may be controlled such that an I-pod or USB that may reproduce music instead of a radio may be operated. Because it may be determined that the I-pod is activated in the current state of the vehicle, a service that reproduces the I-pod may be suggested. In operation S150, according to embodiments of the present disclosure, a voice or an image that tells that 'Reproduction of the I-pod is started' may be output.

Subsequently, when the user selects the suggested service in operation S151 (Yes), operation S153 may be performed. When the user does not select the suggested service in operation S151 (No), an alarm requesting re-speech may be output by using the output unit (S152). As another example, when the input instruction is included in the domain with a keyword, it may be immediately performed without the user is inquired of whether the suggested service is to be executed. Accordingly, operation S151 and S152 may be omitted.

Subsequently, all histories used in a process of selecting the suggested service are stored (S153). Further, when the user selects and performs the suggested service, the initially input instruction of 'Play' is added to the database as a new instruction and is stored (S154).

According to embodiments of the present disclosure, a service that performs an operation of reproducing the I-pod in the music domain by performing the inference operation of FIG. 3 on the input instruction of 'Play' may be suggested.

Figure 4:
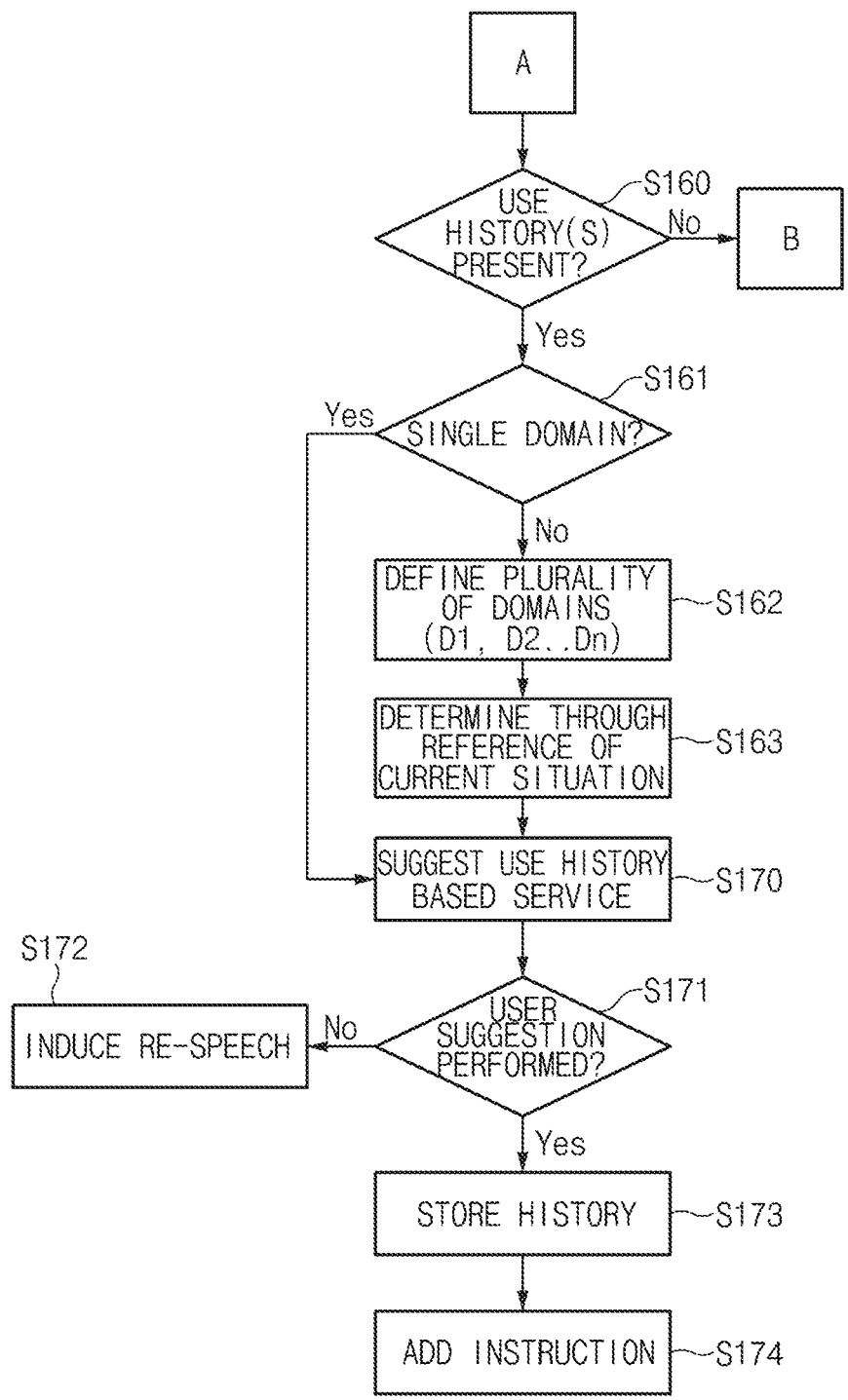

In FIG. 4, in another example, it is assumed that the initially input instruction is 'Back home'.

Because 'Back home' is not an instruction of a format defined by the system, it cannot be searched in the keyword database, and accordingly, a service corresponding to the instruction input by the user by performing the inference process of FIG. 3 cannot be provided. Accordingly, an intention of the user included in the input instruction may be inferred by performing the inference process of FIG. 4.

When it is determined that the input instruction is not present in the service domain (No), the service use history is investigated (S210). In operation S210, the service use history database and the current state database may be referenced. Tables 4 and 5 are tables representing information of the service use history database according to embodiments of the present disclosure.

TABLE 4

| Operation | History of use | Contents of speech |
| --- | --- | --- |
| History of listening to music | Recently played Music Red Cheek Adolescence | Listen to Red Cheek Adolescence |
| Setting history of destination | Home (7/19, 8:30 pm) | Guide route to home |
| | Workplace (7/19, 7 pm) | Go to Workplace |
| | E-Mart (Dongtan) (7/18, 10:00 pm) | Let's go to E-Mart |
| | Korean National Museum (7/15, 9 pm) | Guide route to Korean National Museum |
| Phone call history | Home (7/19, 9 am) | Call home |
| | Kim assistant (7/19 10:10 am) | Call Kim assistant |

TABLE 5

| Operation | History of use | Contents of speech |
| --- | --- | --- |
| History of listening to music | Recently played Music (Red Cheek Adolescence) | Listen to Red Cheek Adolescence |
| Setting history of destination | Home (7/19, 8:30 pm) | Guide route to home |
| | Workplace (7/19, 7 pm) | Go to Workplace |
| | E-Mart (Dongtan) (7/18, 10:00 pm) | Let's go to E-Mart |
| | Korean National Museum (7/15, 9 pm) | Guide route to Korean National Museum |
| Phone call history | Home (7/19, 9 am) | Call home |
| | Kim assistant (7/19 10:10 am) | Call Kim assistant |

In operation S160, referring Table 4, a phone call history may be investigated for the instruction of 'Back home'. Accordingly, it is determined in an operation (S160) of identifying whether a use history is present from the call of 'Back home' that the use history of the instruction is present (Yes). When it is determined that the use history of the instruction is not present in operation S160, operation B is performed.

In an operation (S161) of identifying whether the use history of the instruction is searched in a single domain, it may be determined that it is searched in the domain of the 'phone', that is, in one domain. When it is determined that the use history is searched in a single domain in operation S161, a service is suggested based on the use history of the instruction (S170). When it is determined that the user history is not searched in the single domain in operation S161, operation S162 is performed.

In operation S150, according to embodiments of the present disclosure, a voice or an image that tells that 'May I call home?' may be output. It is determined whether the suggested service will be performed according to selection of the user (S171). When the user performs a service suggested by selecting the suggested service in operation S171 (Yes), all histories used in the process of selecting the suggested service is stored (S173). Further, when the user selects and performs the suggested service, the instruction of 'Back home' uttered by the user is added to the database as a new instruction and is stored (S174). When the user does not select the suggested service in operation S171 (No), an alarm requesting re-speech may be output by using the output unit and the conversation session may be maintained while the service is not terminated (S172).

According to embodiments of the present disclosure, a service that performs an operation of calling in the music domain by performing the inference operation of FIG. 3 on the uttered instruction of 'Back home' may be provided.

Meanwhile, in operation S160, referring to Table 5, it may be determined that a destination setting history and a phone calling history are present for the instruction of 'Back home'. Further, in operation S161, it may be determined that the instruction is not searched in the single domain.

In this case, the plurality of domains D1, D2, . . . , Dn are defined (S162). According to embodiments of the present disclosure, navigation information and phone information may be extracted from the plurality of domains. Further, any one of the plurality domains is selected and a use history is determined with reference to the current state database (Table 3) (S163). In operation S63, a suitable use history may be determined by comparing the current situation database (Table 3) and the use history database (Table 5). That is, the current situation database (Table 3) in which a destination is not set at 8:30 p.m. and the user history database (Table 5) in which a destination is set to the house at 8:30 p.m. in the destination setting history may be compared, and accordingly, the use history for the uttered instruction of 'Back home' may be determined as setting of the destination.

A service is suggested based on the determined use history (S170). In operation S150, according to embodiments of the present disclosure, a voice or an image that tells that 'May I guide the road?' may be output. It is determined whether the suggested service will be performed according to selection of the user (S171). When the user performs a service suggested by selecting the suggested service in operation S171 (Yes), all histories used in the process of selecting the suggested service is stored (S173). Further, when the user selects and performs the suggested service, the instruction of 'Back home' uttered by the user is added to the database as a new instruction and is stored (S174). When the user does not select the suggested service in operation S171 (No), an alarm requesting re-speech may be output by using the output unit and the conversation session may be maintained while the service is not terminated (S172).

In another example, a service that performs an operation of setting a destination in the navigation domain by performing the inference operation of FIG. 4 on the uttered instruction of 'Back home' may be provided.

Figure 5:
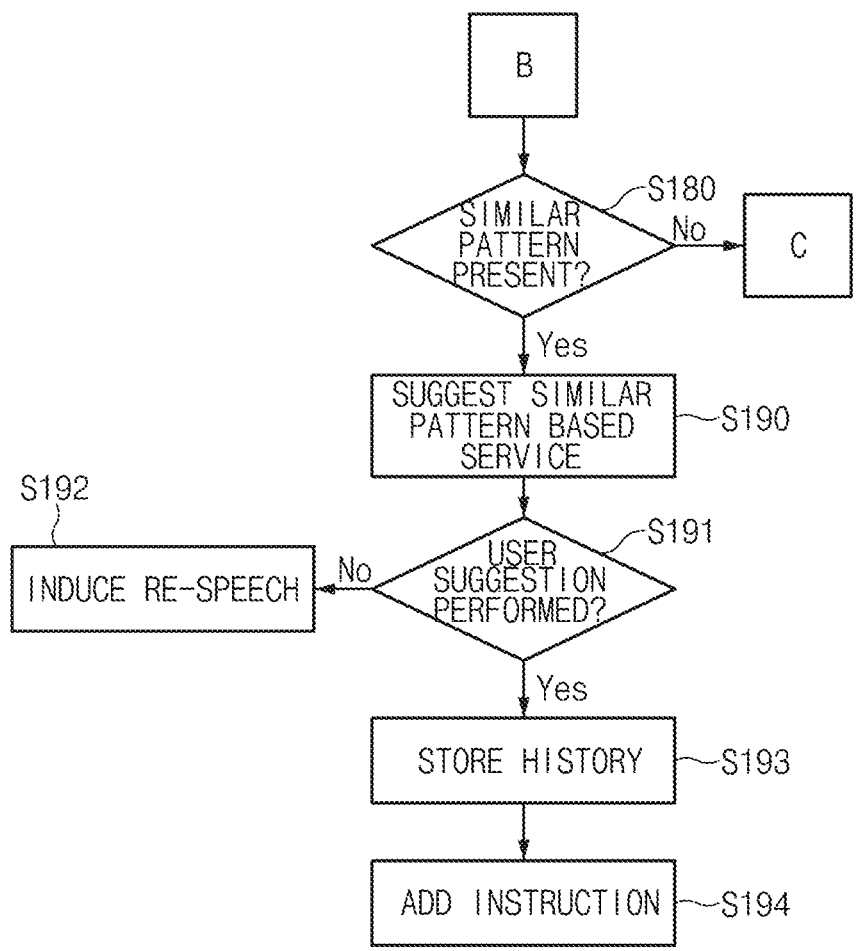

FIG. 5 illustrates an example in which the instruction initially uttered by the user is difficult to understand and has no instruction use history. In such case, the instruction is an instruction that cannot be inferred through the first and second inferences of the present disclosure. For example, it is assumed that the user uttered an instruction, such as 'so', 'how', 'what will we do?', or 'what', that cannot be easily recognized in a state in which the system requests the user to utter a speech. In this way, an intention of the user included in the instruction input through the inference process of FIG. 5 on an instruction that is difficult to understand and has no use history may be inferred.

As shown in FIG. 5, when the input instruction has no use history (No), the service use pattern of the user is analyzed and it is determined whether a similar pattern is present (S180). Operation S180 may be performed by referring to the future inference database and the current state database (Table 3) in which a schedule of the user and a pattern of the user are stored. Operation S180 may be performed based on service use pattern information generated through combination of one or more services repeatedly used for not less than a first period.

Table 6 represents information of the future inference database. As demonstrated in Table 6, when a service of setting a destination to the house, setting the radio frequency to 91.9, setting the interior temperature of the vehicle to 22 degrees at 8:30 p.m. every day is repeatedly used a predetermined number of times, it is defined as a leaving-work time to be stored.

TABLE 6

| Inclination (preferred) item | Contents | Suggested | Priority |
|---|---|---|---|
| Schedule 1 (meeting) | Meeting 1: 9 am (Place: Coffee Bean), Meeting 2: 3 pm (Place undecided) | X | 2 |
| Schedule 2 (birthday) | Wife | ○ | 3 |
| Set destination | Set destination within 5 minutes after boarding vehicle | ○ | 3 |
| Pattern of going to work | 7:00 am, Destination: Workplace, Radio: 104.5, Air conditioner: Internal air 25 degrees | X | 1 |
| Pattern of going to home | 8:30 pm, Destination: Home, Radio: 91.9, Air conditioner: Internal air 22 degrees | ○ | 1 |
| Oiling | Oiling condition is that a tank is always filled more than half | X | 4 |

It is determined whether a pattern that is similar to the current state is present. Operation S180 may be performed with reference to Tables 3 and 6. Referring to Table 3, because the current time is 8:30 p.m., the leaving-office pattern and the time coincide in Table 3. Accordingly, in operation S180, it may be determined that the similar pattern is present (Yes), and the similar pattern may be applied to the leaving-work pattern. Further, a plurality of values (a destination, a radio, and air conditioning) are set to the leaving-work pattern, they are compared with the values set in the current situation to determine a service to be suggested. When a pattern that is similar to the current situation is not present in operation S180 (No), operation C is performed.

According to embodiments of the present disclosure, because the current interior temperature of the vehicle does not differ from the temperature set in the leaving-work pattern, no suggestion is made. Meanwhile, because the current destination setting information is not set and the radio in the vehicle is turned off, it is different from the leaving-work pattern. Accordingly, the value set in the leaving-work pattern is suggested (S190).

In operation S190, according to embodiments of the present disclosure, a voice or an image that tells that 'Will you back home while listening to music?' may be output. It is determined whether the suggested service will be performed according to selection of the user (S191). When the user performs a service suggested by selecting the suggested service in operation S191 (Yes), all histories used in the process of selecting the suggested service is stored (S193). Further, when the user selects and performs the suggested service, the instruction of 'Back home' uttered by the user is added to the database as a new instruction and is stored (S194). When the user does not select the suggested service in operation S191 (No), an alarm requesting re-speech may be output by using the output unit and the conversation session may be maintained while the service is not terminated (S192).

According to embodiments of the present disclosure, a service in which the system uttered from the user performs an inference process of FIG. 5 for an instruction that is difficult to understand and has no instruction use history, adjusts a frequency after turning on the radio, setting the destination to the house, and sets the air conditioning temperature to 22 degrees may be suggested.

Figure 6:
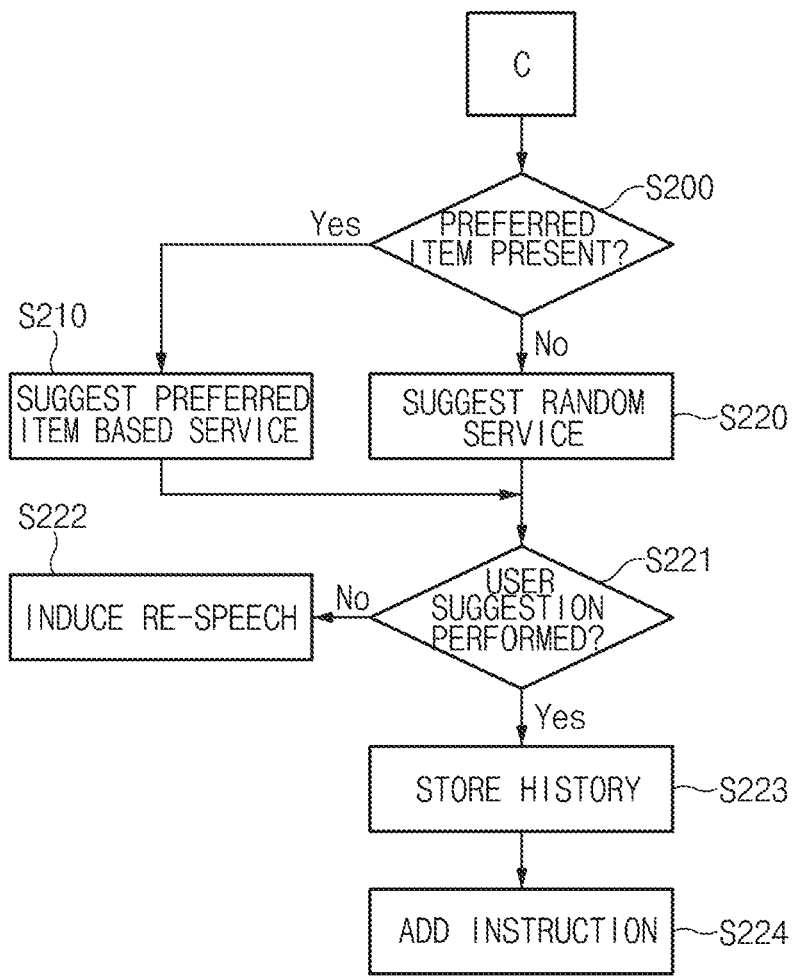

FIG. 6 illustrates an example in which the instruction initially uttered by the user is difficult to understand and has no use history as in the instruction used in the embodiment of FIG. 5. The instruction is an instruction that cannot be inferred through the inference process of FIGS. 3, 4, and 5. In this way, an intention of the user included in the instruction input through the inference process of FIG. 6 on an instruction that is difficult to understand and has no use history may be inferred.

As shown in FIG. 6, when the current situation is compared and no similar pattern is present (No), a service preferring item is analyzed (S200). In operation S220, the service preferring item database and the current state database may be referenced. Table 7 represents information of the service preferring item database. Tables 8 and 9 are tables representing information of the current state history database according to an embodiment.

Referring to Table 7, in operation S200, it may be determined whether a service preferring item may be generated through combination of one or more services repeatedly used for not less than a second period of time.

Data may be stored in the service preferring item database based on a service use frequency based on the pattern of the user. For example, when a specific service is provided while a vehicle is used during going or leaving to work every day and the service information is used for 5 months, the taste of the user may be determined based on the provided service.

TABLE 7

| Inclination (preferred) item | Contents | Priority |
|---|---|---|
| In-car temperature (Internal air) | 25 degrees (60%), 20 degrees (20%), 30 degrees (20%) | 3 |
| Setting and driving destination | Driving after setting destination (70%): Setting within 5 minutes after start of driving | 3 |
| Listening to music while driving | Listen (80%), not listen (20%) | 2 |
| Frequent played music | Red Cheek Adolescence (40%), Kim Gun-mo (30%), Vanilla Acoustic (30%) | 2-1 |
| Gas warning light | Warning light: off (no oil required), warning light: ON (gasoline required) | 1 |
| Gas station brand | GS Caltex (90%), SK gas station (10%) | 1-1 |

TABLE 8

| Inclination (preferred) item | Current situation | Suggested |
|---|---|---|
| In-car temperature (Internal air) | 24 degrees | X |
| Setting and driving destination | Set | X |
| Listen to music while driving | Music OFF | ○ |
| Frequent played music | — | X |
| Gas warning light | OFF | X |
| Gas station brand | — | X |

TABLE 9

| Inclination (preferred) item | Current situation | Suggested |
|---|---|---|
| In-car temperature (Internal air) | 24 degrees | X |
| Setting and driving destination | Not setting | ○ |
| Listening to music while driving | Music ON | X |
| Frequent played music | — | X |
| Gas warning light | OFF | X |
| Gas station brand | — | X |

In operation S200, according to embodiments of the present disclosure, it may be determined that a preferred item is generated with reference to Table 7, and a priority may be set to the preferred item. Here, the priority may be set by the user.

Comparing Tables 7 and 8, because the user is not listening to music in the vehicle and listening to music is present in the preferred item, listening to music may be suggested as a service (S210). In operation S210, if the frequently listening music and the recently listening music coincide with each other, listening to music of the corresponding singer may be suggested as a service. Further, if the frequently listening music and the recent music do not coincide with each other, a singer may be selected with reference to a highest probability in the frequently listening music. In operation S210, according to embodiments of the present disclosure, a voice or an image that tells that 'May I turn on red cheek music?' may be output.

Further, in comparison of Tables 7 and 9, because the destination in the vehicle is not set and a destination is set to the preferred item, setting of the destination may be suggested as a service (S210). A frequent destination setting history at a corresponding time is identified based on the current time in operation S210 and a probability of setting the corresponding destination at the corresponding time is a specific value or more, a destination guide service to the corresponding site may be suggested. In operation S440, according to embodiments of the present disclosure, a voice or an image that tells that 'May I guide the road?' may be output.

In operation S200, when the service preferring item cannot be generated (No), a random service is suggested (S220). When the tendency of the user cannot be determined, the use history is not sufficient due to the small number of uses of the system or the taste of the user cannot be easily analyzed. operation S220 may be performed based on the current state database. Table 10 represents information of the current state database.

TABLE 10

| Item | Current situation (8:30 PM) | Priority | Suggested |
|---|---|---|---|
| In-car temperature (Internal air) | 24 degrees | 3 | X |
| Setting and driving destination | Not setting | 3 | ○ |
| Listening to music while driving | Music off | 4 | ○ |
| Frequent played music | | 2-1 | X |
| Gas warning light | on | 1 | X |
| Gas station brand | | 1-1 | |

In operation S220, referring to Table 10, a service may be suggested by determining whether the priority of the current situation data and a need for a suggestion. The priority may be different according to information set by the user. According to embodiments of the present disclosure, because a destination is not set in operation S220, setting of a destination may be suggested, and because there is not music in the vehicle, listening to music may be suggested. Because the priority of the item for setting a destination, among the suggested two services, is higher, a service for setting a destination may be suggested. Additionally, when a use history database is secured, a service for guiding the user to a set destination at around 8:30 p.m. with reference to destination setting history information may be suggested.

After operations S210 and S220, it is determined whether the suggested service will be performed, according to selection of the user (S221). When the user performs a service suggested by selecting the suggested service in operation S221 (Yes), all histories used in the process of selecting the suggested service is stored (S223). Further, when the user selects and performs the suggested service, the instruction uttered by the user is added to the database as a new instruction and is stored (S224). When the user does not select the suggested service in operation S221 (No), an alarm requesting re-speech may be output by using the output unit and the conversation session may be maintained while the service is not terminated (S222).

According to embodiments of the present disclosure, the system uttered from the user performs the inference process of FIG. 6 even when an instruction that is difficult to understand and has no use history to suggest listening of music of a specific singer and to suggest setting of a destination to the house.

Figure 7:
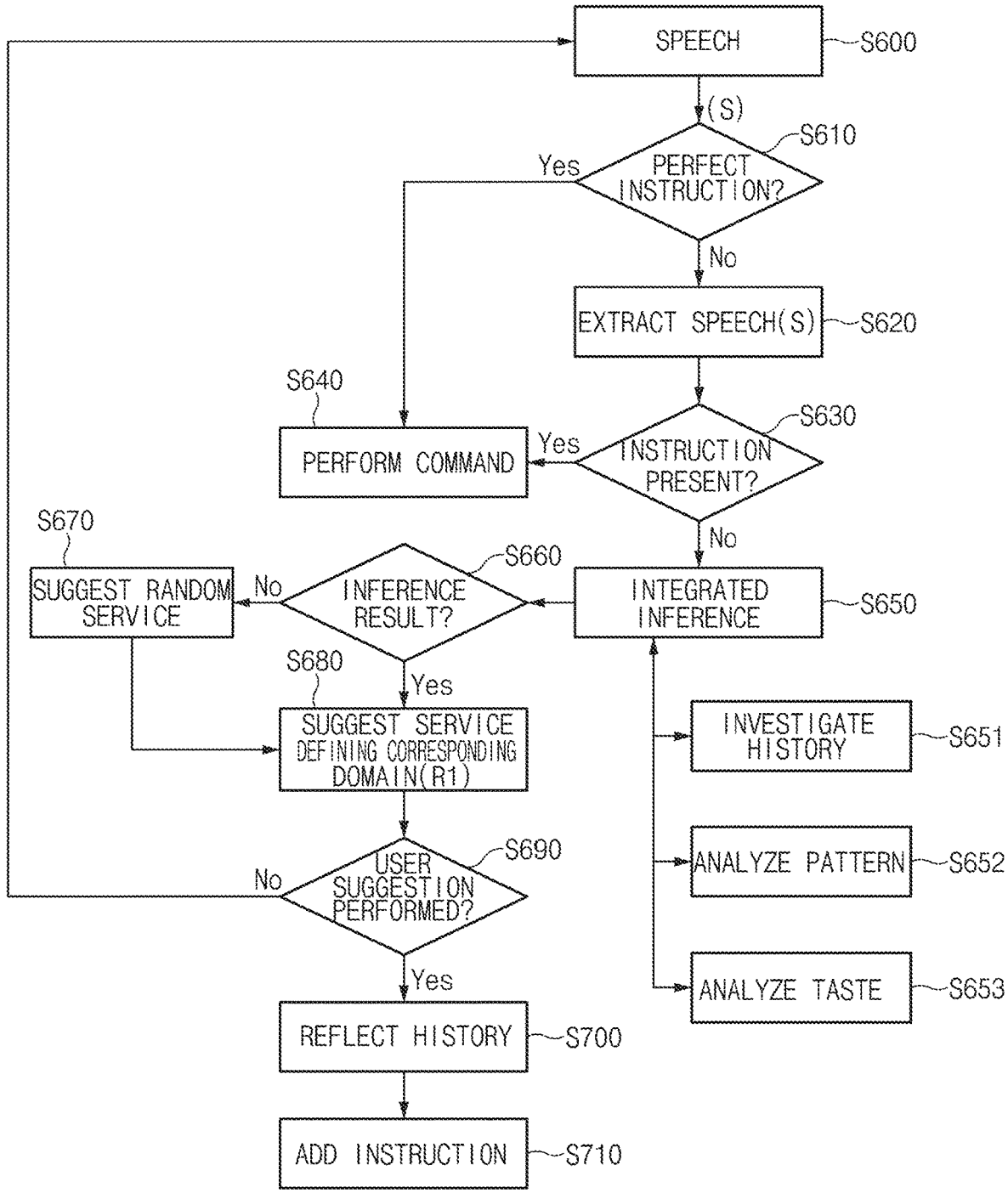
FIG. 7 is an additional flowchart illustrating all operations of a method for controlling a vehicular voice recognition system according to embodiments of the present disclosure.

FIG. 7 is an additional flowchart illustrating all operations of a method for controlling a vehicular voice recognition system according to embodiments of the present disclosure.

The method for controlling a voice recognition system according to embodiments of the present disclosure includes a method for integrating the results after performing inferences in parallel in FIG. 7. If the results of the inferences performed in parallel are the same, a service corresponding to the inference result may be suggested, and if different inference results appear, the service having the highest priority of the corresponding suggestions may be suggested first.

As illustrated in FIG. 7, the input instruction may be converted to a text to be recognized (S600). Further, it is identified whether the input instruction pertains to a perfect instruction (S610). When a perfect instruction is not included (No), some instructions of the contents uttered by the user are extracted (S620). Further, it is determined whether the extracted instruction is present in the database (S630). Meanwhile, when the instruction input in operation S610 is included in the perfect instruction (Yes) or the instruction extracted in operation S630 is present in the database (Yes), a command is performed (S640). Through operation S640, the corresponding service may be suggested by recognizing the intention of the user only with the contents uttered by the user.

When the instruction extracted in operation S630 is not present in the database (No), integrated inference may be performed based on at least one of a use history of the input instruction, service use pattern information or a service preferring item (S650). Operation S650 may include operation S651, operation S652, and operation S653.

In operation S651, a use history may be investigated based on a current state database and a service use history database for the input instruction, and the intention of the user may be inferred based on the use history. FIG. 4 is referenced for a more detailed description thereof.

In operation S652, the pattern of the user may be analyzed based on the current state database and the future inference database for the extracted instruction, and the intention of the user may be inferred based on the pattern of the user. FIG. 5 is referenced for a more detailed description thereof.

In operation S653, the pattern of the user may be analyzed based on the current state database and the service preferring item database for the extracted instruction, and the intention of the user may be inferred based on the tendency of the user. FIG. 6 is referenced for a more detailed description thereof.

According to embodiments of the present disclosure, when the result of operation S651 and the result of operation 653 are the same and the result of operation 652 is different from the remaining operations, the result of operation S652 is ignored and integrated inference may be performed with the results of operation S651 or operation S653.

If the performance results of operation S651, operation s652, and operation S653 are different, integrated inference may be made as a result with a high priority according to the priority. Further, if only one result value is present after the performance result of operation S651, operation s652, and operation S653, integrated inference may be made with the corresponding result.

After operation S650, it is determined whether an inference result is present (S660). When an inference result is not present (No), a random service is suggested (S670). Operation S670 may be performed based on the current situation database.

When an inference result is present in operation S660 (Yes), a service defined in a domain corresponding to the inference result is suggested (S680). In operation S680, the service contents may be output in a voice or an image through the output unit. It is determined whether the suggested service will be performed according to selection of the user (S690). When the user performs a service suggested by selecting the suggested service in operation S690 (Yes), all histories used in the process of selecting the suggested service is stored (S700). Further, when the user selects and performs the suggested service, the instruction of 'Back home' uttered by the user is added to the database as a new instruction and is stored (S710). When the user does not select the suggested service in operation S690 (No), an alarm requesting re-speech may be output by using the output unit and the conversation session may be maintained while the service is not terminated (S600).

Figure 8:
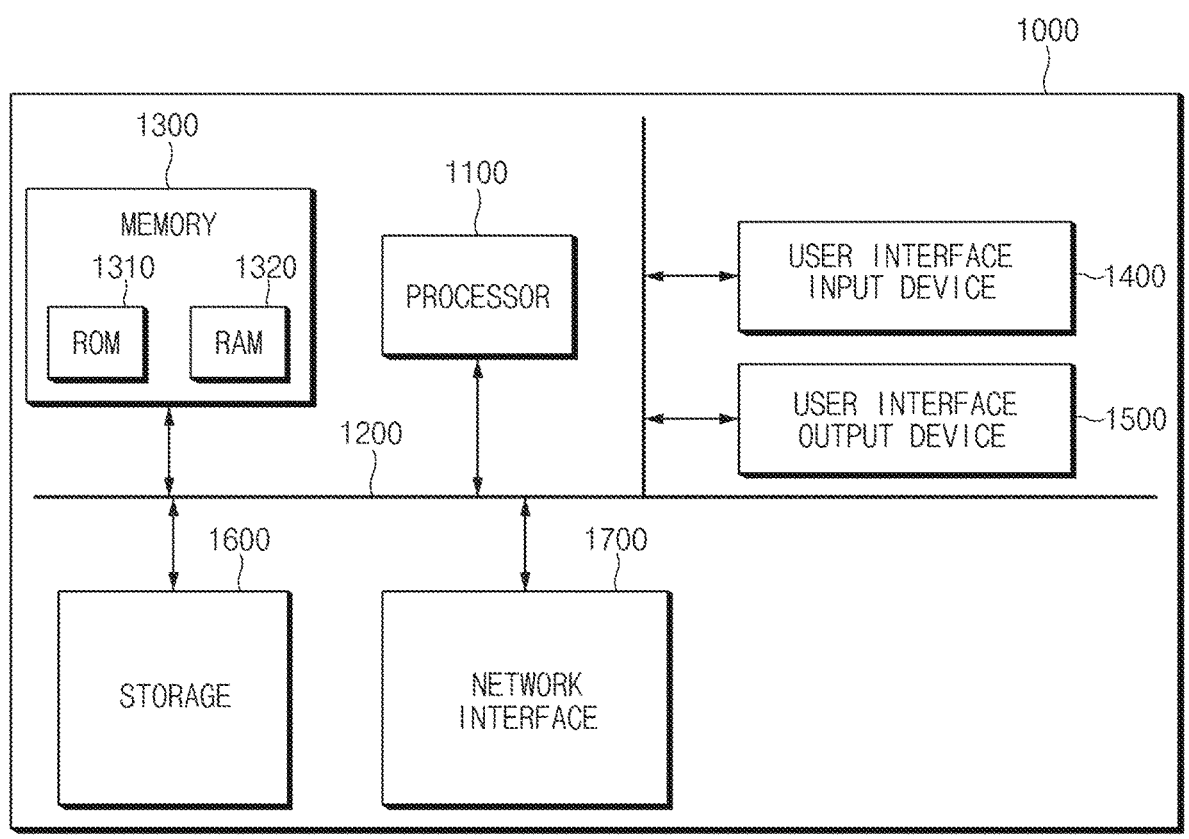
FIG. 8 is a block diagram illustrating a configuration of a computing system that executes the method according to embodiments of the present disclosure.

FIG. 8 is a block diagram illustrating a configuration of a computing system that executes the method according to embodiments of the present disclosure.

As shown in FIG. 8, the computing system 1000 may include at least one processor 1100 connected through a bus 1200, a memory 1300, a user interface input device 1400, a user interface output device 1500, a storage 1600, and a network interface 1700.

The processor 1100 may be a central processing unit (CPU) or a semiconductor device that processes instructions stored in the memory 1300 and/or the storage 1600. The memory 1300 and the storage 1600 may include various volatile or nonvolatile storage media. For example, the memory 1300 may include a read only memory (ROM) and a random access memory (RAM).

Accordingly, the steps of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM memory, a flash memory, a ROM memory, an EPROM memory, an EEPROM memory, a register, a hard disk, a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component The present disclosure infers the intention of the user through voice recognition for an instruction uttered by the user, thereby providing a service that is suitable for the current situation and accomplishing an object desired by the user. Further, the present disclosure may provide a service desired by the user by analyzing an instruction based on a database stored in advance instead of terminating the service due to the failure of the recognition even when the instruction uttered by the user is not accurately recognized.

The above description is a simple exemplification of the technical spirit of the present disclosure, and the present disclosure may be variously corrected and modified by those skilled in the art to which the present disclosure pertains without departing from the essential features of the present disclosure.

Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. A vehicular voice recognition system for inferring an intention of a user, the vehicular voice recognition system comprising:
    a storage storing an instruction use history and service use pattern information;
    a controller receiving an input instruction of the user, performing at least one of: a first inference operation of determining a service domain among a plurality of service domains corresponding to the input instruction and providing a service in the determined service domain, a second inference operation of providing a service based on the stored instruction use history, a third inference operation of providing a service based on the stored service use pattern information, and a fourth inference operation of providing a service based on a service preferring item stored in the storage when the service preferring item is generated, and providing a random service based on a current state of the vehicle when an intention of the input instruction cannot be inferred through the first interference operation, the second interference operation, the third interference operation, and the fourth interference operation; and
    an output unit provided in a vehicle outputting contents of the provided service using at least one of audio and images.

2. The vehicular voice recognition system of claim 1, wherein the controller changes the input instruction to text and performs the first to fourth inference operations based on the changed input instruction.

3. The vehicular voice recognition system of claim 1, wherein the controller performs the first inference operation based on whether the input instruction coincides with a keyword in the service domain and a current state of the vehicle.

4. The vehicular voice recognition system of claim 1, wherein:
    the controller determines whether the instruction use history is defined in a service domain among the plurality of service domains, and
    when the use history is not defined in a service domain, the controller performs the second inference operation of providing the service by selecting any one of the plurality of service domains based on a current state of the vehicle.

5. The vehicular voice recognition system of claim 1, wherein the controller performs the third or fourth inference operations when an intention of the input instruction cannot be inferred through the first inference operation and the second inference operation.

6. The vehicular voice recognition system of claim 1, wherein:
    the controller determines whether pattern information among the service use pattern information is similar to a current state of the vehicle, and
    when similar pattern information is present, the controller performs the third inference operation of providing the service based on the similar pattern information.

7. The vehicular voice recognition system of claim 1, wherein the service use pattern information is generated through one or more services repeatedly used in the vehicle for a first period of time or more.

8. The vehicular voice recognition system of claim 7, wherein the controller determines whether the service preferring item can be generated through one or more services repeatedly used for not less than a second period of time that is longer than the first period of time.

9. A method for controlling a vehicular voice recognition system for inferring an intention of a user, the method comprising:
    receiving an input instruction of the user; determining a service domain among a plurality of service domains corresponding to the input instruction;
    when the service domain is not determined, determining an instruction use history of the input instruction;
    when the instruction use history of the input instruction is not determined, determining service use pattern information;
    when the service use pattern information is not determined, determining a service preferring item;
    when the service preferring item is not determined and an intention of the input instructions cannot be inferred, providing a random service based on a current state of the vehicle; and
    outputting contents of the provided service in a vehicle using at least one of audio and images.

10. The method of claim 9, wherein the determining of the service domain corresponding to the input instruction is performed based on whether the input instruction coincides with a keyword in the service domain and a current state of the vehicle.

11. The method of claim 9, further comprising:
    when the service domain is determined, providing a service defined in the determined domain.

12. The method of claim 9, wherein the determining of the instruction use history of the input instruction comprises:
  determining whether the instruction use history of the input instruction is present;
  when the instruction use history is present, determining whether the instruction use history is defined in a service domain among the plurality of service domains; and
  when the instruction use history is not defined in the service domain, selecting any one of the plurality of service domains based on a current state of the vehicle.

13. The method of claim 12, further comprising:
  when the instruction use history of the input instruction is determined, providing a service defined in a service domain defining the instruction use history or any one service domain selected from the plurality of domains.

14. The method of claim 9, wherein the determining of the service use pattern information includes:
  determining whether pattern information among the service use pattern information that is similar to a current state of the vehicle is present.

15. The method of claim 14, wherein the determining of the service use pattern information is performed based on the service use pattern information generated through one or more services repeatedly used in the vehicle for a first period of time or more.

16. The method of claim 15, wherein the determining of the service preferring item includes:
  determining whether the service preferring item is to be generated through one or more services repeatedly used for not less than a second period of time that is longer than the first period of time.

17. The method of claim 16, further comprising:
  when the service preferring item can be generated, providing a service based on the service preferring item.

18. The method of claim 14, further comprising:
  after the determining of the service use pattern information, when the similar pattern information is present, providing a service based on the similar pattern information.

19. A method for controlling a vehicular voice recognition system for inferring an intention of a user, the method comprising:
  receiving an input instruction of the user; determining whether the input instruction is present in an instruction database;
  when the input instruction is not present in the instruction database, performing integrated inference based on at least one of: an instruction use history of the input instruction, service use pattern information, and a service preferring item;
  identifying whether a result of the integrated inference is present;
  providing a service defined in the service domain corresponding to the result of the integrated inference when the result of the integrated inference is present; and
  providing a random service based on a current state of the vehicle when the result of the integrated inference is not present and an intention of the input instruction cannot be inferred.

20. The method of claim 19, wherein the performing of the integrated inference includes:
  selecting any one of: a first inference result inferred through an operation of investigating an instruction use history of the recognized instruction, a second inference result inferred through an operation of determining service use pattern information based on the instruction use history, and a third inference result inferred through an operation of determining the service preferring item.

21. The method of claim 19, wherein the performing of the integrated inference includes:
  when any two results of the first to third inference results overlap each other, selecting the overlapping results as an inference result.

* * * * *